(12) United States Patent
Raggi et al.

(10) Patent No.: US 7,175,148 B2
(45) Date of Patent: Feb. 13, 2007

(54) APPARATUS FOR ATTACHING A SIDE-VIEW MIRROR TO A VEHICLE

(75) Inventors: Emil J. Raggi, Garland, TX (US); Troy R. McCuller, Corinth, TX (US); Louis D. Heilaneh, Lewisville, TX (US)

(73) Assignee: PACCAR Inc, Bellevue, WA (US)

( * ) Notice: Subject to any disclaimer, the term of this patent is extended or adjusted under 35 U.S.C. 154(b) by 41 days.

(21) Appl. No.: 11/085,357

(22) Filed: Mar. 21, 2005

(65) Prior Publication Data

US 2006/0208148 A1  Sep. 21, 2006

(51) Int. Cl.
*A47F 7/14* (2006.01)
(52) U.S. Cl. .................................. 248/475.1; 359/871

(58) Field of Classification Search ............. 248/475.1, 248/466, 476; 359/871, 875
See application file for complete search history.

(56) References Cited

U.S. PATENT DOCUMENTS

| 4,500,063 | A | * | 2/1985 | Schmidt et al. .......... 248/475.1 |
| 5,069,410 | A | * | 12/1991 | McKee .................... 248/475.1 |
| 6,491,402 | B1 | * | 12/2002 | Stenzel ...................... 359/871 |

* cited by examiner

*Primary Examiner*—Ramon O Ramirez
(74) *Attorney, Agent, or Firm*—Sidley Austin LLP

(57) ABSTRACT

A bracket is provided for attaching a cylindrical strut, such as a side-view mirror support, to a motor vehicle. The bracket comprises an internal bracket adapted to be fastened to the motor vehicle and an external bracket adapted to be fastened to the internal bracket. The cylindrical strut is clamped between clamping surfaces of the internal and external brackets. The external bracket has a streamlined shape.

24 Claims, 4 Drawing Sheets

APPARATUS FOR ATTACHING A SIDE-VIEW MIRROR TO A VEHICLE

The present invention generally relates to an apparatus for attaching a cylindrical strut to a motor vehicle, and more particularly to an apparatus for attaching a side-view mirror to a vehicle such as a truck or highway tractor.

BACKGROUND OF THE INVENTION

Various methods have been used to attach a side-view mirror to a truck cab or door. For example, a strut-like framework for supporting the mirror may be fastened directly to the door or cab structure using screws, bolts, rivets, and the like. Such mounting methods often require many parts. In addition, the framework and protruding fasteners are unsightly and result in increased aerodynamic drag. A mirror mounted on a truck door is more susceptible to damage due to vibration and impact such as when the door is being opened or shut. It would therefore be desirable to provide a mirror mounting bracket that is aesthetically pleasing, aerodynamically efficient, uses few parts, and is robust in design.

SUMMARY OF THE INVENTION

The above, and other objects advantages of the present invention are provided by a two-part bracket, including an internal bracket fastened to the vehicle structure and an external bracket that is fastened to the internal bracket. The internal and external brackets include matching concave portions adapted to clamp a strut or other supporting structure there between. The external bracket of the bracket is designed to have an aerodynamic efficient shape.

BRIEF DESCRIPTION OF THE DRAWINGS

The above and other objects and advantages of the present invention will be understood upon consideration of the following detailed description taken in conjunction with the accompanying drawings, in which like reference characters refer to like parts throughout, and in which.

DETAILED DESCRIPTION

Figure 1:
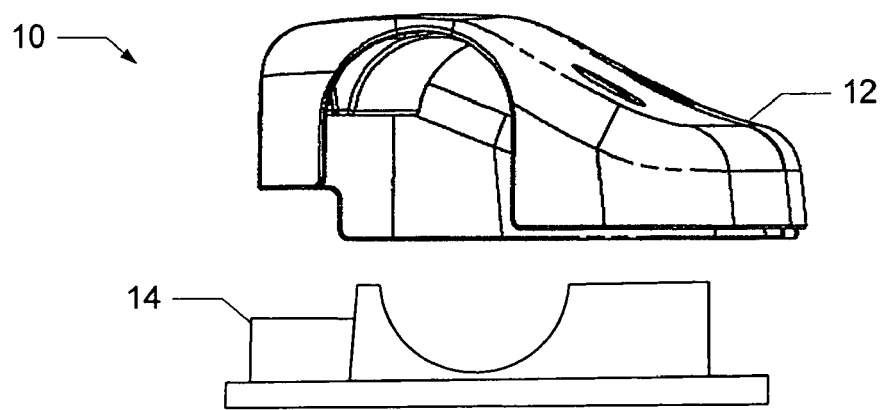
FIG. 1 shows an illustrative embodiment of a two-part bracket constructed in accordance with the principles of the present invention.

Referring first to FIG. 1, bracket 10 includes external bracket 12 and internal bracket 14. It should be noted that the illustrative embodiment of bracket 10 shown in FIGS. 1 through 10 is a left-hand bracket, that is one suitable for mounting on the left-hand, or driver's, side of a motor vehicle. It is to be understood that a bracket for mounting on the right-hand side of a motor vehicle would be substantially a mirror image of the bracket shown.

Figure 2:
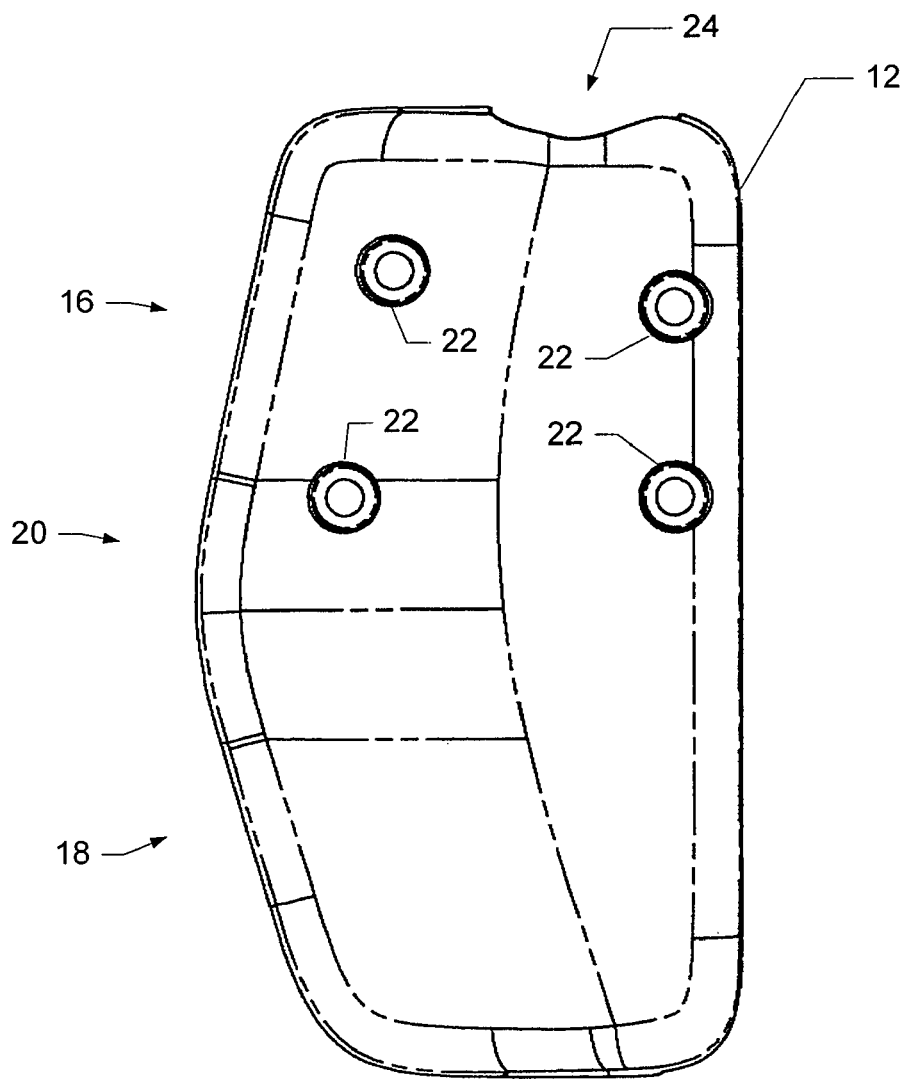
FIG. 2 shows an illustrative embodiment of an external bracket of the two-part bracket of FIG. 1.
Figure 5:
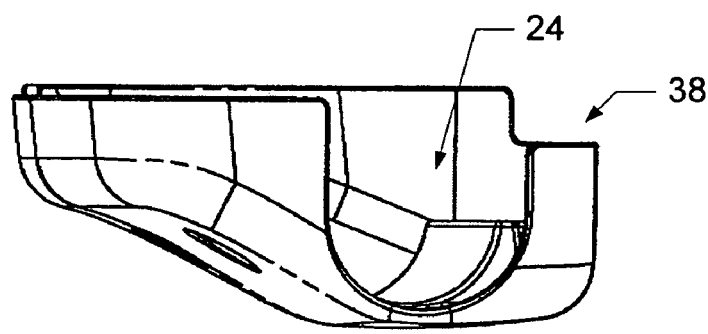
FIG. 5 is a view of an upward-facing end of the bracket of FIG. 2.
Figures 3, 4:
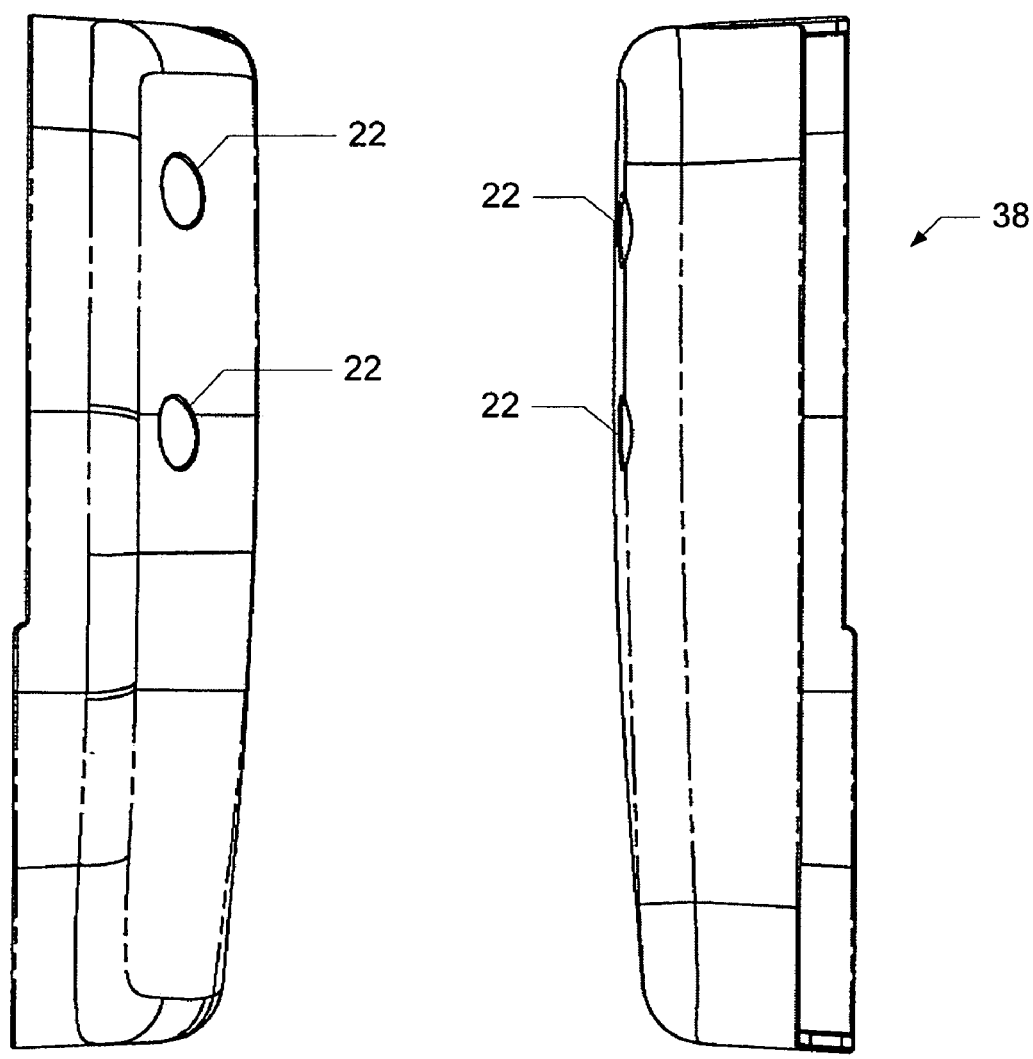
FIGS. 3 and 4 are, respectively, views showing the front-facing and rear-facing sides of the bracket of FIG. 2.

As shown in FIGS. 2 through 4, external bracket 12 has an exterior surface configured to reduce aerodynamic drag or wind resistance. For example, the edges and corners of external bracket 12 are radiused, and the leading edge of external bracket 12 includes upward angled portion 16, downward angled portion 18, and radiused central portion 20. Bolt holes 22 are counter bored so that the heads of any fasteners inserted therein do not protrude into the slipstream around external bracket 12. As shown in FIG. 5, the thickness of the leading portion of external bracket 12 increases gradually and smoothly over a significant portion of the width of the bracket. These features are designed to smooth airflow over the surface of external bracket 12, thereby reducing aerodynamic drag, wind drag, and noise.

As shown in FIG. 5, the upper-facing end of external bracket 12 includes an opening 24 for accepting a cylindrical strut, such as a support for a mirror. Preferably, the size of opening 24 is just large enough to accept the strut so airflow into opening 24 is minimized.

Figure 7:
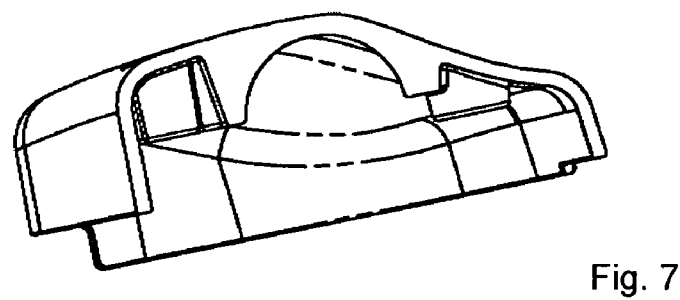
FIGS. 7 and 8 are sectional views showing the interior structure of the bracket of FIG. 2 in more detail.
Figure 6:
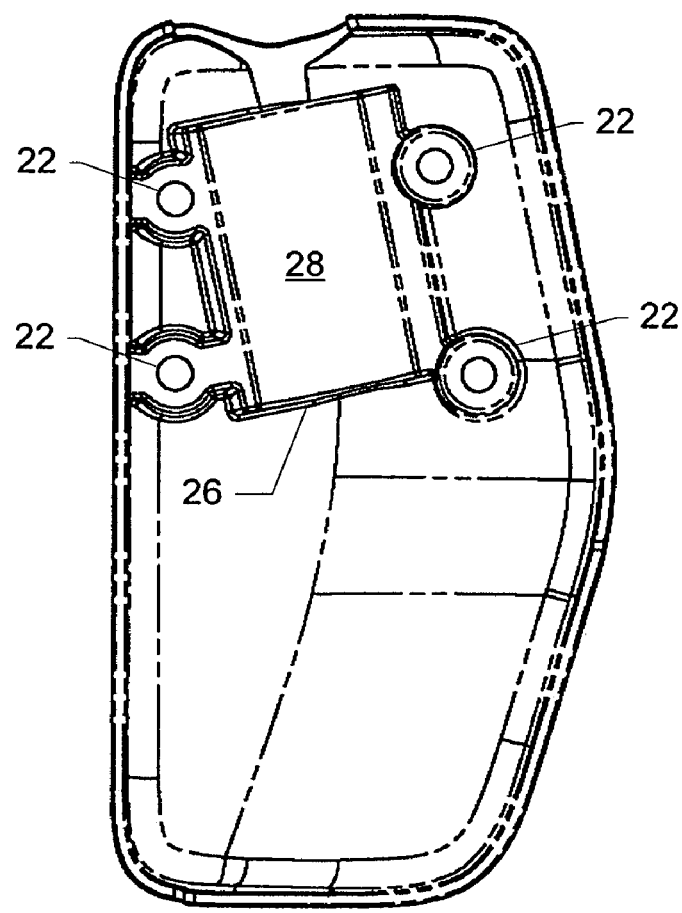
FIG. 6 is an interior view of the bracket of FIG. 2.
Figure 8:
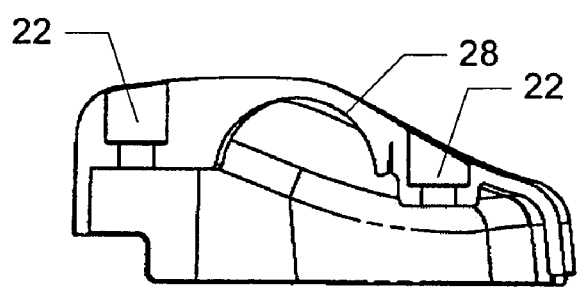

Referring now to FIG. 6, external bracket 12 is largely a thin shell of metal or other suitable material. External bracket 12 includes thicker portion 26 disposed near opening 24. Clamping surface 28 is a concave surface formed in thicker portion 26. Preferably, clamping surface 28 has a generally constant radius corresponding to a radius of a cylindrical strut to be used with bracket 10 of FIG. 1. Bolt holes 22 also pass though thicker portion 26 to provide reinforcement thereof. The interior of external bracket 12 may also include ribs and the like to reinforce and strengthen external bracket 12. FIGS. 7 and 8 are cross sectional views of external bracket 12, showing more details of thicker portion 26 and clamping surface 28.

Figure 9:
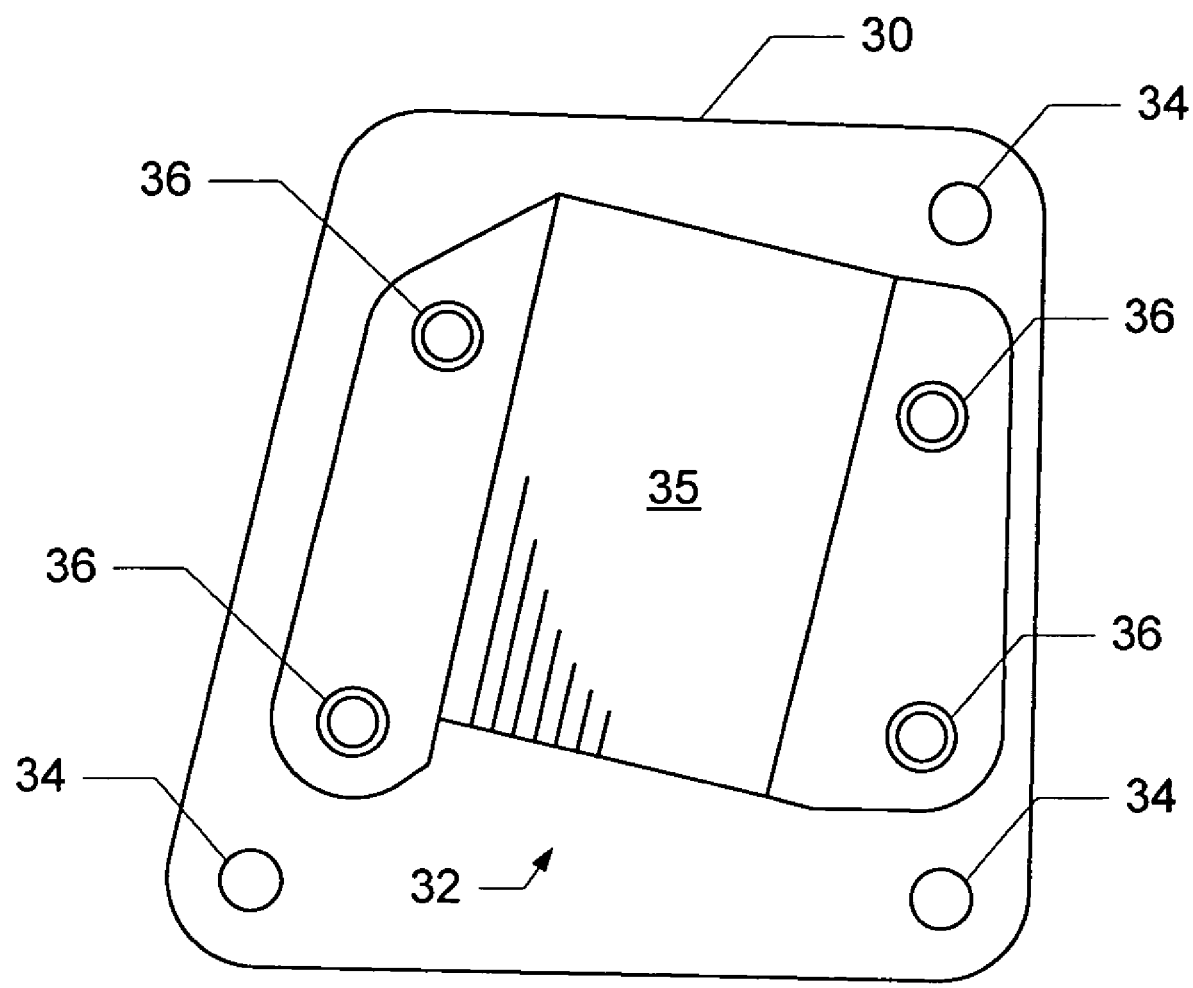
FIG. 9 is a view of an illustrative embodiment of an internal bracket of the two-part bracket of FIG. 1.

Internal bracket 14 is shown in FIGS. 1 and 9. Internal bracket 14 includes base 30 and raised portion 32. A perimeter of base 30 has a shape conforming to the shape of external bracket 12. The back of base 30 is typically flat, but may be shaped to match the external surface of the vehicle at the location internal bracket 14 is to be installed. Base 30 includes multiple holes or bores 34 for accepting bolts, screws, rivets and the like by which base 30 is securely fastened to the vehicle. Alternatively, internal bracket 14 may be welded or adhesively bonded to the vehicle and holes 34 may be omitted in base 30.

Raised portion 32 includes clamping surface 35. Like clamping surface 28 of external bracket 12, clamping surface 35 has a generally constant radius corresponding to a radius of a cylindrical strut to be used with bracket 10 of FIG. 1. Raised portion 32 further includes tapped holes 36.

To use bracket 10 of FIG. 1, internal bracket 14 is fastened to the cab or other portion of a motor vehicle. External bracket 12 is loosely connected to internal bracket 14 by means of bolts or other threaded fasteners inserted through bolt holes 22 in external bracket 12 and into tapped holes 36 to engage the threads therein. A generally cylindrical strut (not shown) such as a mirror support is inserted through opening 24 in external bracket 12 so that an end thereof is interposed between clamping surfaces 28 and 35 of external bracket 12 and internal bracket 14, respectively. Preferably, the forward pair of threaded fasteners are tightened completely. Tightening the rear pair of threaded fasteners to an appropriate torque then causes the cylindrical strut to be securely clamped between the clamping surfaces of internal bracket 14 and external bracket 12. As shown in FIG. 5, external bracket 12 may have a notched or recessed edge 38 designed to fit over base 30 of internal bracket 14 to provide clearance between the brackets when the threaded fasteners are tightened. Notch 38 may also aid in aligning external bracket 12 with internal bracket 14 during assembly.

Preferably, bracket 10 is configures to support providing electrical cabling through bracket 10, for example, to provide connections for antennas or lights mounted on a mirror support structure, or to provide power to the mirrors themselves. An opening may be provided in the skin of the vehicle so that cabling may be run through the opening and into the strut itself. To accommodate the provision of such electrical cabling, the outer shell of external bracket 12 extends beyond internal bracket 14, so that the extended portion of external bracket 14 covers the opening, as well as streamlines and protects the cabling.

Thus, a bracket for attaching a cylindrical strut to a motor vehicle has been disclosed. It will be readily apparent that the apparatus thus disclosed may be useful for other applications and that various modifications may be made to the disclosed embodiment without departing from the spirit and scope of the invention. Accordingly, one will understand that the description provided herein is provided for purposes of illustration and not of limitation, and that the invention is limited only by the appended claims.

What is claimed is:

1. A bracket for fastening a cylindrical object to a motor vehicle, the bracket comprising:
    an inner bracket having a concave clamping surface and a plurality of spaced-apart threaded bores, the inner bracket adapted to be fastened to the motor vehicle; and
    an outer bracket having an inner surface defining a concave clamping surface and an outer surface having an aerodynamic shape including a leading portion having an upward sloping portion, a downward sloping portion, and a curved portion therebetween, the outer bracket including a plurality of spaced-apart, counter bored holes corresponding to the spaced-apart threaded bores,
    wherein the cylindrical object is clamped between the respective concave clamping surfaces of the inner and outer brackets when threaded fasteners inserted through the holes and into the threaded bores are tightened.

2. The bracket of claim 1, wherein the leading portion has a thickness that is less than a thickness of a rearward portion of the outer bracket.

3. The bracket of claim 1, wherein the concave clamping surfaces of the inner and outer brackets define a cylindrical surface.

4. The bracket of claim 1, wherein the concave clamping surfaces of the inner and outer brackets are configured so that the cylindrical object is disposed at an angle relative to a vertical direction.

5. The bracket of claim 4, wherein the cylindrical object is disposed at an angle such that an upper portion of the cylindrical object is rearward of a lower portion of the cylindrical object, with respect to the vehicle.

6. Apparatus for motor vehicle side view mirrors, the apparatus comprising:
    a pair of brackets adapted to couple a mirror support structure to the vehicle, the pair of brackets including left and right side brackets, each comprising:
        an internal clamp configured to be coupled to the vehicle and including a clamping portion; and
        an external clamp configured to be coupled to the internal clamp and to clamp the mirror support structure between the internal and external clamps,
    wherein a portion of the mirror support structure clamped between the internal and external clamps has a cylindrical shape, and the internal and external clamps each have portions having a corresponding shape, and
    wherein a mirror support structure disposed in the right and left side brackets is angled to the rear of the vehicle.

7. The apparatus of claim 6, wherein the left and right side brackets are substantially mirror symmetrical to one another.

8. The apparatus of claim 7, wherein the left and right side brackets each have forward facing portions including an upward facing portion and a downward facing portion.

9. The apparatus of claim 6, wherein the external clamp has a reentrant portion adapted to mate with a corresponding portion of the internal clamp for aligning the external clamp to the internal clamp.

10. The apparatus of claim 6, further comprising a plurality of threaded fasteners adapted to couple the external clamp to the internal clamp so as to frictionally engage the mirror support structure between the internal and external clamps.

11. The apparatus of claim 10, wherein an exterior surface of the external clamp includes counter-bored holes configured to recess heads of the threaded fasteners.

12. The apparatus of claim 11, wherein the external clamp has a reentrant portion adapted to mate with a corresponding portion of the internal clamp for aligning the external clamp to the internal clamp.

13. The apparatus of claim 6, wherein the external clamp includes a shell extending beyond an extent of the internal clamp to accommodate the provision of electrical cabling to a structure mounted in the clamp.

14. A bracket for fastening a cylindrical object to a motor vehicle, the bracket comprising:
    an inner bracket having a concave clamping surface and a plurality of spaced apart threaded bores, the inner bracket adapted to be fastened to the motor vehicle; and
    an outer bracket having an inner surface defining a concave clamping surface and an outer surface having an aerodynamic shape, the outer bracket including a plurality of spaced-apart, counter bored holes corresponding to the spaced-apart threaded bores,
    wherein the cylindrical object is clamped between the respective concave clamping surfaces of the inner and outer brackets when threaded fasteners inserted through the holes and into the threaded bores are tightened, and the concave clamping surfaces of the inner and outer brackets are configured so that the cylindrical object is disposed at an angle relative to a vertical direction.

15. Apparatus for fastening a tube to a motor vehicle, the apparatus comprising:
    an inner clamp having a first concave surface portion and a flange portion configured to be fastened to the motor vehicle; and
    an outer clamp configured to be fastened to the inner clamp and comprising an inner surface and an outer surface, the inner surface having a second concave surface portion and the outer surface having a forward edge that extends forward of a forward edge of the inner clamp,
    wherein the first and second concave surface portions are juxtaposed adjacent each other when the inner and outer clamps are fastened together so as to clamp the tube therebetween.

16. The apparatus of claim 15, wherein the outer surface has a lower edge that extends below a lower edge of the inner clamp when the inner and outer clamps are fastened together.

17. The apparatus of claim 16, wherein the inner surface includes a hollow portion adjacent the second concave surface portion and extending lower than the lower edge of the inner bracket when the inner and outer brackets are fastened together.

18. The apparatus of claim 15, wherein the outer surface encloses at least an upper, forward, and lower edge of the flange.

19. The apparatus of claim 15, wherein the first and second concave surfaces are configured so that the tube is disposed at an angle such that an upper portion of the tube is rearward of a lower portion of the tube, with respect to the vehicle.

20. A clamp for fastening a support for a mirror to a motor vehicle, the apparatus comprising:
   a first member including:
      a flange for fastening the first member to the motor vehicle; and
      a first clamping surface disposed from the flange; and
   a second member configured to be fastened to the first member and including:
      an outer shell having a streamlined outer surface configured so that when the clamp is assembled, by fastening the second member to the first member, the outer shell encloses at least a forward edge of the flange; and
      a second clamping surface disposed from an inner surface of the outer shell so that when the clamp is assembled the first and second clamping surfaces are juxtaposed so as to clamp the support therebetween.

21. The clamp of claim 20, wherein the outer shell has a lower edge that extends below a lower edge of the inner clamp when the clamp is assembled.

22. The clamp of claim 20, wherein the outer shell includes a hollow portion between the lower edge and the second clamping portion.

23. The clamp of claim 20, wherein the outer shell further encloses an upper edge of the flange.

24. The clamp of claim 20, wherein the first and second clamping surfaces are configured so that the support is disposed at an angle, with respect to the vehicle, such that an upper portion of the support is rearward of a lower portion of the support.

* * * * *

UNITED STATES PATENT AND TRADEMARK OFFICE
CERTIFICATE OF CORRECTION

PATENT NO. : 7,175,148 B2 Page 1 of 1
APPLICATION NO. : 11/085357
DATED : February 13, 2007
INVENTOR(S) : Emil J. Raggi, Troy R. McCuller and Louis D. Heilaneh It is certified that error appears in the above-identified patent and that said Letters Patent is hereby corrected as shown below:

<u>Column 4</u>:
Line 7, delete "claim 7," and insert -- claim 6, --.

Signed and Sealed this

Twenty-sixth Day of June, 2007

JON W. DUDAS
*Director of the United States Patent and Trademark Office*